United States Patent [19]

Olier et al.

[11] 3,824,466

[45] July 16, 1974

[54] SYSTEM FOR THE TRANSMISSION OF DATA SIGNALS BY LINEAR FREQUENCY MODULATION EMPLOYING CIRCUIT IN A RECEIVER TUNED TO A CENTRAL FREQUENCY

[75] Inventors: Claude Olier; Guy Albert Jules David, both of Thiais, France

[73] Assignee: U.S. Philips Corporation, New York, N.Y.

[22] Filed: Dec. 29, 1972

[21] Appl. No.: 319,543

[30] Foreign Application Priority Data

Jan. 7, 1972 France .............................. 72.00453

[52] U.S. Cl. ............ 325/30, 178/66 R, 178/69.5 R, 325/163, 325/320

[51] Int. Cl. ............................................ H04b 1/00

[58] Field of Search..... 178/66 R, 66 A, 88, 69.5 R; 325/30, 163, 320; 329/104; 331/54, 55, 179

[56] References Cited

UNITED STATES PATENTS 3,248,664 4/1966 Krasnick et al. ...................... 325/30

3,493,865 2/1970 Miller ................................. 325/30

*Primary Examiner*—Albert J. Mayer

*Attorney, Agent, or Firm*—Frank R. Trifari

[57] ABSTRACT

A system for the transmission of data signals by linear frequency modulation employing a transmitter and a receiver which are synchronized by a circuit present in the receiver which is tuned to a central frequency of the frequency modulated signal applied to a filter the output of which is connected to a detector. Output pulses from the detector, after regeneration in a regenerator, control a digital circuit for controlling the clock phase.

The transmitter includes a voltage controlled oscillator (VCO) in a control loop between the oscillator output and control input of the oscillator for maintaining the central frequency of the oscillator constant.

The transmitter also includes a saw-tooth generator provided with a control loop for maintaining the slope of the saw-tooth voltage constant.

4 Claims, 3 Drawing Figures

SYSTEM FOR THE TRANSMISSION OF DATA SIGNALS BY LINEAR FREQUENCY MODULATION EMPLOYING CIRCUIT IN A RECEIVER TUNED TO A CENTRAL FREQUENCY

The invention relates to a system for the transmission of data signals by linear frequency modulation, comprising a transmitter which includes a modulator provided with a sawtooth voltage generator for producing a sawtooth voltage whose slope varies positively or negatively dependent on whether the binary value of the data signal to be transmitted is one or zero. A voltage-controlled oscillator (VCO) is provided which is controlled by said sawtooth voltage for producing a corresponding linear frequency-modulated signal, and a receiver which is adapted for the reception of said linear frequency-modulated signal. The system also includes, which furthermore comprises a synchronizing circuit for generating a local clock signal whose frequency is equal to that of the data signal, and whose phase is determined by the mean rhythm of the received data.

In systems of the kind described above, the sawtooth voltage, which is applied to the voltage-controlled oscillator (VCO) present in the transmitter, ensures that the frequency of the output signal from this oscillator varies linearly about a central frequency $f_o$, which is located between the frequency values $f_o + \Delta f/2$ and $f_o - \Delta f/2$, with a slope which is positive or negative dependent on whether the binary elements have the value 1 or 0. The successive frequency sweeps $\Delta f$ occur in the rhythm of the binary elements to be transmitted. The central frequency $f_o$ represents a first central frequency in the transmitter. The signal received in the receiver undergoes different frequency transpositions resulting in a modulated signal of central frequency being obtained, which has the same frequency characteristics as that in the transmitter. It is this modulated signal, having a central frequency $f_o$ of, for example, 50 kHz and a frequency sweep $\Delta f$ of, for example, 3 kHz which is applied to the input of the synchronizing circuit of the receiver. To recover the rhythm of the received data for the purpose of the phase control of the clock pulse generator of the receiver, use is made of the fact that the frequency $f_o$ occurs in the middle of the period of each binary element. To detect the instants when the frequency-modulated signal has the value $f_o$, a frequency discriminator is used in the known synchronizing circuits. The use of an analog frequency discriminator has the drawback that such a circuit does not provide output pulses which can be directly used in a logic circuit for the phase control of clock pulse generator. In addition, an analog frequency discriminator always has deviations which cannot easily be compensated for. Digital frequency discriminators have the drawback that they are sensitive to interference pulses, and that the signal-to-noise ratio at the input of these discriminators must be large.

The object of the invention is to provide a novel synchronizing circuit used in such a system in which the above-mentioned drawbacks are entirely obviated.

According to the invention, a system of this kind has a synchronizing circuit in the receiver which comprises a narrow-band input filter, which is tuned to the central frequency $f_o$ of the frequency-modulated signal applied to the filter, and a detector connected to the output of said filter. The output pulses from said detector control, after regeneration in a regenerator, a digital circuit for controlling the clock phase. The voltage-controlled oscillator (VCO) present in the transmitter comprises a control loop arranged between the oscillator output and the control input of said oscillator for maintaining the central frequency $f_o$ of said oscillator constant. The sawtooth generator present in the transmitter being is provided with a control loop for maintaining the slope of said sawtooth voltage constant.

When using the invention, an accurate detection was found to be possible for a quantity of "white" noise at the input corresponding to a signal-to-noise ratio of −18 dB.

The invention will be further described with reference to the drawings in which.

Figure 1:
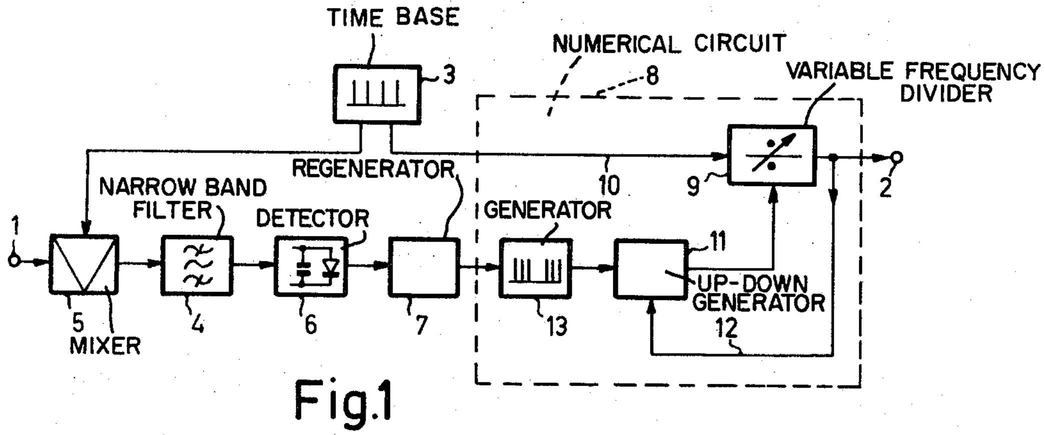
FIG. 1 shows a block schematic diagram of a synchronizing circuit which is used in the receiver of the system according to the invention.

In FIG. 1 the received modulated signal which is transposed to a given central frequency is applied to the input 1 of the circuit.

Figure 2:
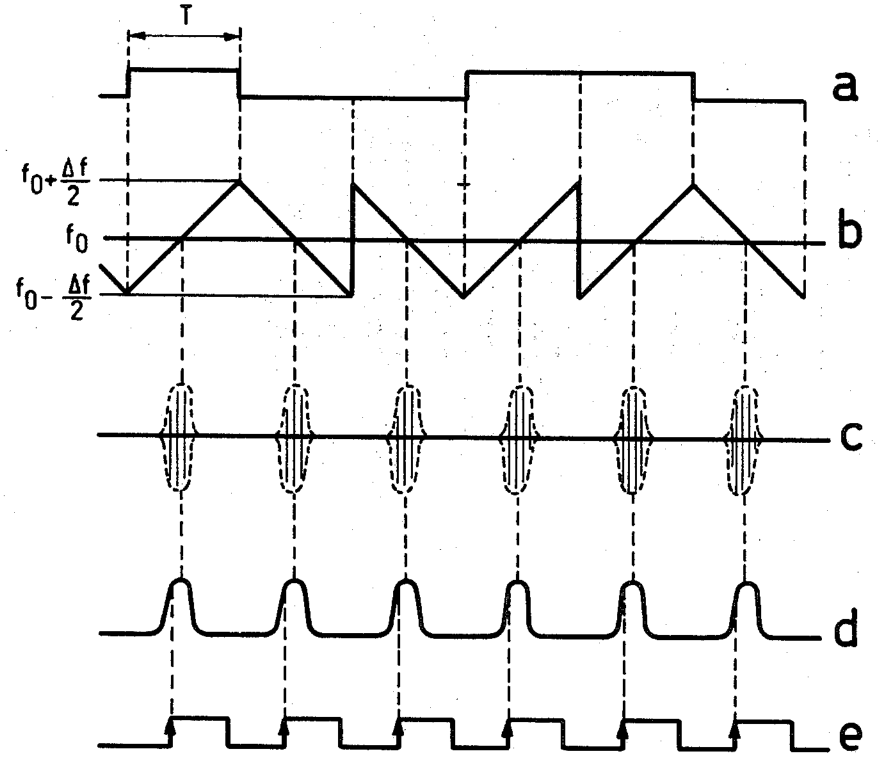
FIG. 2 shows some diagrams to explain the circuit of FIG. 1.

In FIG. 2 a succession of data having a duration of $T$ (rhythm $1/T$) is shown at *a* and the frequency of the resultant modulated signal is shown at *b*. During the period of each binary element, this frequency varies linearly between the value $f_o - \Delta f$ and $f_o + \Delta f$, with a slope which is positive or negative dependent on whether the binary elements have the value 1 or 0. The central frequency $f_o$ is, for example, the intermediate frequency obtained after frequency transposition in the receiver. This intermediate frequency signal is applied to the input 1 of the synchronizing circuit; said frequency $f_o$ is, for example, 50 kHz while the frequency sweep $\Delta f$ is, for example, 3 kHz.

A local clock signal whose frequency ($1/T$) corresponds to the frequency of the data pulses, and whose phase is adapted to the mean rhythm of the receive data pulses, is to be obtained at the output 2 of said synchronizing circuit. The frequency $1/T$ is derived, for example, from a time base 3 which is controlled by a quartz crystal. The rhythm of the received data is determined by the instants when the frequency of the modulated central frequency signal has the value $f_o$.

According to the invention, the synchronizing circuit shown in FIG. 1 has a narrow-band input filter 4, which is tuned to the central frequency of the modulated signal applied to the filter. The signal applied to the input of the filter is, for example, the modulated signal of intermediate frequency $f_o = 50$ kHz, but in the embodiment according to FIG. 1, the intermediate frequency signal applied to the input 1, undergoes a frequency transposition in the mixer circuit 5 due to a signal of fixed frequency of 60 kHz, which is provided by the time base 3, and this in such a manner, that the central frequency of the modulated signal applied to the input of the filter is 10 kHz. This additional frequency transposition has only for its object to facilitate the construction of the filter 4. The output of the filter 4 is connected to the input of a detector 6, whose output signal controls, via a regenerator 7, a circuit 8 for the numerical adaptation of the clock phase of the data of the receiver.

The synchronizing circuit operates as follows: As in the embodiment shown in FIG. 1, it is assumed that the modulated signal (FIG. 2b) which is applied to the input of the filter 4 has a central frequency $f_o$ of 10kHz. A signal whose amplitude is shown in FIG. 2c is obtained at the output of the filter 4, whose central frequency is also 10 kHz, and whose pass band is, for example, 100 Hz. This output signal has a frequency of approximately 10 kHz, and is amplitude-modulated by a series of pulses whose shape is determined by the response characteristic of the filter. The amplitude is maximum at the instants when the frequency of the modulated signal has obtained the value $f_o = 10$ kHz, hence in the center of each binary element, and whose rhythm corresponds to the rhythm of the received data.

It is to be noted that the modulated signal applied to the input of the filter 4 likewise obtains the frequency value $f_o$ upon the transition between two binary elements of the same value (see FIG. 2b). In that case, however, the response time of the filter is very short (for example, 300 $\mu$s) as compared with the duration T (for example, 10 ms) of the frequency sweep $\Delta f$, which is produced by the binary elements of the data. The energy transferred to the filter is very small, and the response of the filter is substantially negligible.

The output signal from the filter 4 is detected by the detector 6, which applies a signal illustrated at *d* in FIG. 2, to the input of the regenerator 7. The output signal from the regenerator 7 is shown in FIG. 2e. The transitions of this signal, which are denoted by arrows, occur in accordance with the rhythm of the received data, and are used in the numerical circuit 8 for adapting the clock phase of the data.

In the embodiment shown in FIG. 1, the circuit 8 includes a variable frequency divider 9 which receives pulses from time base 3 through the lead 10 at a frequency which is, for example, 100 times the clock frequency $1/T$ of the data. In the case where said divider 9 does not receive a phase correction signal, this divider divides the frequency of said pulses by 100 so that local clock pulses having a frequency of 1 occur at its output 2. The phase correction signals are brought about by the up - down counter 11, which is alternately brought to the up-counting and down-counting positions through lead 12, during the successive periods of the local clock generator. The input of the counter 11 receives pulses provided by the generator 13, which transmits a series of pulses (for example, 6 pulses in the rhythm of 15 kHz) at each representative transition of the rhythm of the received data (transitions denoted by arrows in FIG. 2e). When the local clock pulses have the same phase as these transitions, the contents of counter 11 remain unchanged whereas, dependent on the pulses being leading or lagging, the contents of said counter 11 will increase or decrease. Filtering is performed by the counter 11, which varies the division factor of the divider 9 for correcting the local clock phase only when a given positive or negative counting threshold is achieved.

In order to recover the rhythm of the received data with the required precision at the output of regenerator 7, the central frequency of the modulated signal applied to the filter 4 must be stable, and the response time of the filter is to be constant, which means that the slope of the frequency modulation is to be constant.

The requirements to be imposed on the modulated signal are dependent on the modulation performed in the transmitter of the transmission system. The invention comprises arrangements which make it possible to satisfy said requirements.

Figure 3:
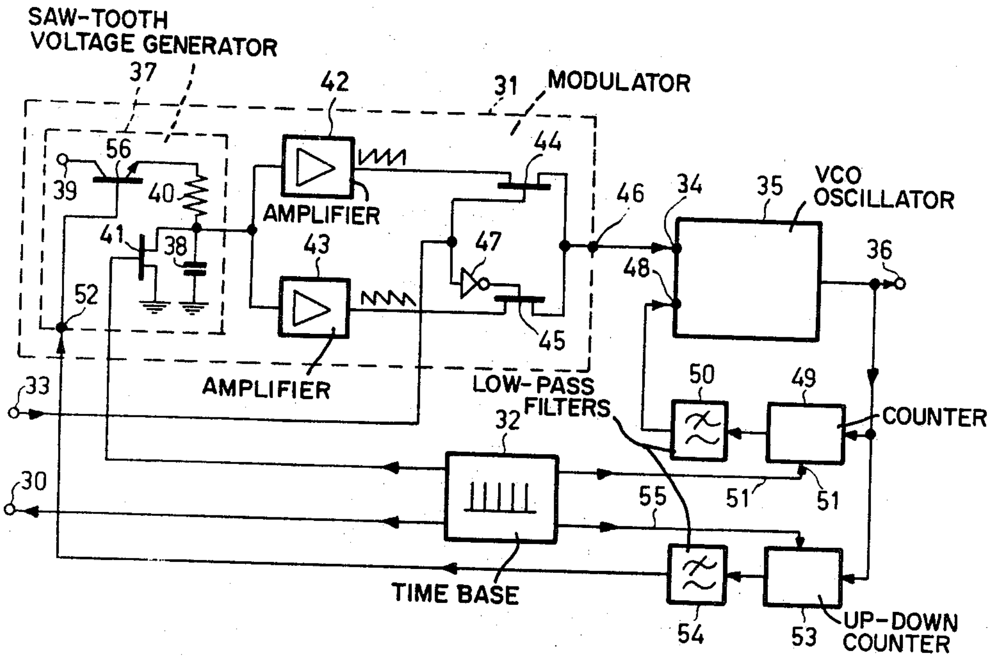
FIG. 3 shows an embodiment of the modulator used in the transmitter of the system according to the invention.

FIG. 3 diagrammatically shows the transmitter elements with which linear frequency modulation is performed by the data to be transmitted.

The data provided are applied to an input terminal 30 of a modulator 31 in accordance with a rhythm $1/T$ which is determined by a time base 32 connected to terminal 30. This time base 32 is controlled by a quartz crystal.

The embodiment of the modulator 31 is such that it provides a sawtooth voltage having a positive or negative going slope dependent on whether a binary element applied to the modulator has the value 1 or 0. When this voltage is applied to the control terminal 34 of the VCO oscillator 35, it applies a frequency-modulated signal to its output connected to the terminal 36 at a mean frequency $f_o$ which corresponds to a first intermediate frequency of the transmitter. The frequency variations of this signal are represented in FIG. 2b in which, for example, $f_o = 50$ kHz, and $\Delta f = 3$ kHz.

According to the embodiment shown in FIG. 3, the modulator 31 includes a sawtooth voltage generator 37. The output voltage of this generator 37 is derived from the terminals of the capacitor 38, which is charged through the resistor 40 by means of a direct voltage applied to the terminal 39, and which is periodically discharged by the switching transistor 41 in accordance with the rhythm $1/T$ which is supplied by the time base 32. The sawtooth voltage provided by the generator 37 is applied to the input of two amplifiers 42 and 43, one of which (for example, the amplifier 43) reverses the signal of the sawtooth slope. The two sawtooth voltages having opposite slopes are applies to the respective input terminals of the two switching transistors 44 and 45, whose common output terminals are connected to the output 46 of the modulator. The data to be transmitted are applied to the control electrodes of the transistors 44 and 45, which is immediately effected where transistor 44 is concerned, and which is effected through the inverter 47 where transistor 45 is concerned. A sawtooth voltage having a positive or negative going slope is obtained at the output 46 of the modulator 31 dependent on whether the binary elements to be transmitted have the value 1 or 0, and this voltage is used for controlling the VCO oscillator 35.

The central frequency of the modulated signal provided by the oscillator 35 is continuously controlled and adjusted at the correct value by means of a digital control loop, which includes a lowpass filter 50, and which is arranged between the output 36 and the control input 48 of the oscillator 35.

A counter 49 is adapted for counting the number of zero crossings of the modulated signal provided by the oscillator 35 during the successive time intervals, each interval being equal to a multiple of the time duration T of a binary element. These time intervals are determined by the correct rhythm (for example, 1/10T) which is supplied through line 51 to the counter by the time base 32, which is controlled by a quartz crystal. Thus it is found, that the counter 49 behaves as a frequency meter which provides a signal at the end of each time interval, which signal is a measure of the central frequency of the modulated signal provided by the oscillator 35. The counter is provided with decoder circuits not shown, which are formed in such a manner that when the contents of the counter, after each measuring time interval, are equal to a predetermined value which corresponds to the desired central frequency (for example $f_o = 50$ kHz), said counter does not provide any pulse, while in the case where the contents of the counter are larger or smaller than the said predetermined value, the counter provides a positive or negative pulse which indicates that the central frequency provided by the oscillator 35 is either higher or lower than the desired value. These pulses are applied to the lowpass filter 50 (for example, an RC network) which applies a direct voltage to the control input 48 of the oscillator 35 so as to correct the central frequency of the modulated signal in the correct sense. The central frequency may be adjusted at a value $f_o = 56$ kHz with a precision of ±5 Hz by means of this circuit.

The modulator of the transmitter likewise has a second digital control loop which must maintain the slope of the linear frequency modulation constant. Since the first loop described permits the correct adjustment of the central frequency, it is sufficient for the said second loop to maintain the value of the frequency sweep $\Delta f$ constant.

To this end, the second loop is provided between the output 36 of oscillator 35 and a terminal 52 for controlling the amplitude of the sawtooth voltage provided by the generator 37. The second loop includes an up-down counter 53, and a lowpass filter 54. The counter 53 is adapted for counting upwards or counting downwards the zero crossings of the modulated signal provided by the oscillator 35. By means of the correct time base 32, (lead 45) the counter 53 is brought to the forward counting position during the first half of the duration T of each binary element, and to the downward counting position during the second half of said duration. Since modulation is effected linearly, the contents of the counter at the end of the duration of each binary element constitute a measure of the amplitude of the frequency sweep of the modulated signal. The contents of the counter may likewise be observed after the duration of a plurality of successive binary elements. When these contents do not have a predetermined value, which corresponds to the desired frequency sweep, (for example, $\Delta f$ =3,000 Hz) a direct voltage is set up for the correction through decoder circuits not shown and the lowpass filter 54, whereafter the said voltage is applied through the terminal 52 to the base of the control transistor 56. This transistor which is arranged in series with the charge circuit of the capacitor 38, corrects the amplitude of the sawtooth voltage provided by the generator 37 in the appropriate sense, which gives rise to the correction of the value of the frequency sweep of the modulated signal at the output of the oscillator 35. This amplitude is maintained at the desired value $\Delta f$ =3,000 Hz in this manner.

What is claimed is:

1. A system for the transmission and reception of linear frequency modulated data signals, comprising:

a transmitter having a modulator comprising a sawtooth voltage generator, said sawtooth voltage generator producing a sawtooth voltage whose slope varies positively and negatively dependent upon whether a binary value of the data signal to be transmitted has a value 1 or 0;

a voltage controlled oscillator connected to said modulator and controlled by said sawtooth voltage, said voltage controlled oscillator producing a linear frequency modulated signal;

means defining a control loop disposed between an output and a control input of said oscillator for maintaining a central frequency $f_o$ of the oscillator constant;

means defining a control loop connected to the output of oscillator and input of said sawtooth voltage generator for maintaining a slope of the sawtooth voltage constant;

a receiver for receiving said linear frequency modulated signals having a synchronizing circuit for generating a local clock signal whose frequency is substantially equal to that of the data signal, said clock signal having a phase determined by mean rhythm of the received data signals, said synchronizing circuit having a narrow-band input filter which is tuned to the central frequency $f_o$ of the frequency modulated signal which is applied to said filter;

a detector connected to an output of said filter;

a regenerator connected to said detector for regenerating output pulses of said detector; and a digital circuit connected to said regenerator for receiving the regenerated output pulses of said detector for controlling the clock phase of the receiver.

2. The system as claimed in claim 1, wherein the digital circuit comprises a controllable frequency divider connected to a first pulse generator for generating the clock pulses, and an up-down counter which is alternately brought to upward and downward counting positions during successive clock pulse periods, and a second pulse generator connected to said counter, said second pulse generator applying a fixed number of pulses to said counter for each transition of the received data signal, said counter providing an output signal which is representative of the phase difference between the clock pulses and said transitions, said output signal being applied as a control voltage signal to said divider for adjusting a division ratio such that said phase difference is counteracted.

3. The system as claimed in claim 1, wherein the control loop means of the voltage-controlled oscillator includes a counter connected to a lowpass filter, said counter for counting the number of the frequency-modulated signal which occur during a time interval corresponding to a multiple of the duration of the binary data signal, said counter providing a pulse after said time interval, when the contents of the counter differs from a given counting value representative of the central frequency $f_o$, said counting pulses being applied as a control signal to said oscillator through said lowpass filter.

4. The system as claimed in claim 1, wherein the control loop means of the sawtooth generator is arranged between the output of the oscillator and an amplitude control input of the sawtooth generator, said control loop including an up-down counter connected to a lowpass filter, said counter for counting the number of periods of the modulated signal in an upward sense during a first half of the duration of each binary data signal and for counting in a downward sense during a second half thereof, so as to provide after a duration of at least one binary data signal a counting value which is representative of a possible deviation of a desired slope, said counting value, converted into a control signal, being applied to the amplitude control input of said sawtooth generator.

* * * * *

PO-1050
(5/69)

UNITED STATES PATENT OFFICE
CERTIFICATE OF CORRECTION

Patent No. 3824466 Dated July 16, 1974

Inventor(s) CLAUDE OLIER; GUY ALBERT JULES DAVID

It is certified that error appears in the above-identified patent and that said Letters Patent are hereby corrected as shown below:

In the title, after "EMPLOYING" insert

--A SYNCHRONIZING--

Column 2, line 6 after "transmitter" delete

"being"

Column 4, line 38 change "applies" to

--applied--

In all instances throughout the patent place quotation marks around "$f_o$"

Signed and sealed this 22nd day of October 1974.

(SEAL)
Attest:

McCOY M. GIBSON JR.
Attesting Officer

C. MARSHALL DANN
Commissioner of Patents